(12) United States Patent
Tsutsumi et al.

(10) Patent No.: US 9,688,204 B2
(45) Date of Patent: Jun. 27, 2017

(54) LADDER OF WORKING VEHICLE

(71) Applicant: KOMATSU LTD., Minato-ku, Tokyo (JP)

(72) Inventors: Katsuhiro Tsutsumi, Hitachinaka (JP); Takehito Takahashi, Hitachinaka, PA (US)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/763,379

(22) PCT Filed: Mar. 23, 2015

(86) PCT No.: PCT/JP2015/058723
§ 371 (c)(1),
(2) Date: Jul. 24, 2015

(87) PCT Pub. No.: WO2015/129929
PCT Pub. Date: Sep. 3, 2015

(65) Prior Publication Data
US 2016/0280138 A1   Sep. 29, 2016

(51) Int. Cl.
*B60R 3/00* (2006.01)
*B60R 3/02* (2006.01)
*E02F 9/08* (2006.01)

(52) U.S. Cl.
CPC .............. *B60R 3/02* (2013.01); *E02F 9/0833* (2013.01); *E02F 9/0858* (2013.01)

(58) Field of Classification Search
CPC . B60R 3/02; B60R 3/04; E02F 9/0858; E06C 9/14
See application file for complete search history.

(56) References Cited

U.S. PATENT DOCUMENTS

| 285,569 | A | * | 9/1883 | Castle | .................... | E06C 9/14 |
| | | | | | | 182/163 |
| 320,114 | A | * | 6/1885 | Bormann | ................ | E06C 1/56 |
| | | | | | | 182/164 |

(Continued)

FOREIGN PATENT DOCUMENTS

| CN | 101487374 A | 7/2009 |
| CN | 102900353 A | 1/2013 |

(Continued)

OTHER PUBLICATIONS

Chinese Office Action (and English translation thereof) dated Feb. 3, 2016, issued in counterpart Chinese Application No. 201580000426.X.

(Continued)

*Primary Examiner* — Colleen M Chavchavadze
(74) *Attorney, Agent, or Firm* — Holtz, Holtz & Volek PC (57) ABSTRACT

A ladder in a multi-step structure includes: first front and rear connecting members that are connected to a vehicle body and between a wheel and an end of the vehicle body and that are juxtaposed with a predetermined space; a first step board that is connected between respective lower ends of the first front and rear connecting members; second front and rear connecting members, respective upper ends of which are connected to both ends of the first step board; and a second step board that is connected between respective lower ends of the second front and rear connecting members. In the first front and rear connecting members, one near the wheel is fixed to the vehicle body and the other near the end of the vehicle body is connected in a pivotally movable manner to the vehicle body and is foldable.

7 Claims, 4 Drawing Sheets

(56) References Cited

U.S. PATENT DOCUMENTS

| | | | | |
|---|---|---|---|---|
| 2,487,921 A | * | 11/1949 | Culver | B60R 3/02 105/448 |
| 2,575,615 A | * | 11/1951 | Crump | B60R 3/02 182/95 |
| 3,516,515 A | * | 6/1970 | Clash | B60R 3/02 182/96 |
| 4,053,172 A | * | 10/1977 | McClure | B60R 3/02 182/89 |
| 4,231,449 A | * | 11/1980 | Laurita | E06C 1/36 182/164 |
| 4,564,205 A | * | 1/1986 | Shookman | B60R 3/00 182/196 |
| 4,751,982 A | * | 6/1988 | Wolfe | E06C 9/14 182/164 |
| 5,022,491 A | * | 6/1991 | Gill | E06C 9/14 182/163 |
| 5,137,294 A | * | 8/1992 | Martin | B60R 3/02 280/166 |
| 5,211,260 A | * | 5/1993 | Toycen | E06C 1/56 182/164 |
| 5,842,709 A | * | 12/1998 | Maccabee | B60R 3/02 182/127 |
| 5,996,737 A | | 12/1999 | Hedley et al. | |
| 6,000,496 A | * | 12/1999 | Rinaldi | B60R 3/02 182/127 |
| 6,119,811 A | * | 9/2000 | Tsung-Ping | E06C 1/36 182/159 |
| 6,942,271 B1 | * | 9/2005 | Jamison | B60R 3/007 14/71.1 |
| 7,013,518 B2 | * | 3/2006 | Leblanc | B65G 69/30 14/69.5 |
| 8,931,792 B1 | * | 1/2015 | Klassen | B60R 3/02 182/65.1 |
| 9,500,027 B2 | * | 11/2016 | Water | E06C 1/383 |
| 2003/0132595 A1 | * | 7/2003 | Fabiano | B60R 3/02 280/166 |
| 2007/0017743 A1 | * | 1/2007 | Yeh | E06C 5/04 182/127 |

FOREIGN PATENT DOCUMENTS

| | | | | |
|---|---|---|---|---|
| CN | 203020205 U | | 6/2013 | |
| FR | 2799424 A1 | * | 4/2001 | B60R 3/02 |
| GB | 1471256 A | | 4/1977 | |
| GB | WO 2009044097 A1 | * | 4/2009 | B60R 3/02 |
| JP | 05089088 U | | 12/1993 | |
| JP | 2008240278 A | | 10/2008 | |
| JP | 2013002209 A | | 1/2013 | |
| SE | WO 9724239 A1 | * | 7/1997 | B60R 3/02 |
| WO | WO 8404560 A1 | * | 11/1984 | E06C 7/18 |

OTHER PUBLICATIONS

Extended European Search Report dated Oct. 14, 2016 issued in counterpart European Application No. 15738561.8.

* cited by examiner

LADDER OF WORKING VEHICLE

TECHNICAL FIELD

The present invention relates to a ladder of a working vehicle.

BACKGROUND ART

In a working vehicle such as a wheel loader, it has typically been known to provide a ladder for an operator to climb up and down in order to move between the ground and an engine room (see, for instance, Patent Literature 1). Such a ladder is provided posterior to rear wheels in a manner to be suspended downward from a vehicle body.

However, a part of the ladder of the wheel loader, which is suspended downward below a departure-angle-defining line connecting a ground touching portion of each of the rear wheels and a lower surface of a counter weight, may be damaged by contact with the ground when a front of the vehicle body is inclined upward during a scraping operation while climbing a mound.

The ladder disclosed in Patent Literature 1 includes: an upper step board having a fixed step board portion disposed near the front of the vehicle and a rotary step board portion that is connected in a pivotally movable manner to the fixed step board portion and is disposed near the back of the vehicle; an elastically deformable first suspension member, an upper end of which is connected in a pivotally movable manner to a front end of the fixed step board portion; an elastically deformable second suspension member, an upper end of which is connected to a rear end of the rotary step board portion; and a lower step board that is connected in a pivotally movable manner between the first and second suspension members.

With this arrangement, when the lower step board comes into contact with the ground during the scraping operation, the lower step board receives external force to be pushed backward. At this time, the lower step board pivots on the first and second suspension members, the first and second suspension members pivot on the fixed step board portion and the rotary step board portion, and the rotary step board portion pivots upward on the fixed step board portion. Accordingly, the entire ladder is folded and received between a fixing portion of the ladder to the vehicle body and the ground, in other words, above the departure-angle-defining line in alignment with the ground, so that damage to the lower step board and the like can be prevented.

On the other hand, Patent Literature 2 discloses a large-sized hydraulic excavator having a ladder in the front of the vehicle body. Patent Literature 2 proposes providing a further step to a lower end of the ladder. The ladder is for the operator to climb up and down from the front of the vehicle. The ladder is configured in a four-link mechanism in which two parallel links are pivotally suspended in a vehicle front-back direction from one of side plates in a vehicle width direction of the ladder, two parallel links are pivotally suspended also from the other of the side plates in the vehicle width direction, and a step board is pivotally provided between the parallel links provided apart in the vehicle width direction.

Also in such a configuration of the ladder, when the vehicle sinks below a surface of a soft ground due to its own weight to cause a lower end of the ladder to contact with the ground, the step board pivots on lower ends of the parallel links to move upward, so that damage to the step board and the like can be prevented. Moreover, since the ladder is additionally attached to the lower end of the ladder and the step board is close to the ground, the ladder can facilitate access to the ladder from the ground.

CITATION LIST

Patent Literature(s)

Patent Literature 1: JP-A-2013-2209
Patent Literature 2: JP-A-2008-240278

SUMMARY OF THE INVENTION

Problems to be Solved by the Invention

In recent years, it has been demanded to achieve easier access to the ladder by further decreasing a height from the ground to the lowest step board of the ladder.

However, in the typical ladder disclosed in Patent Literatures 1 and 2, when the length of each of the first and second suspension members and the links is simply increased and the number of the step board is simply increased as needed, the following problem occurs.

Specifically, for instance, when the wheel loader moves forward with the vehicle body inclined during the scraping operation, the entire ladder is displaced toward the back of the vehicle body, so that damage to the ladder can be avoided. However, when the wheel loader switches the forward movement to the backward movement and moves backward, the entire ladder is folded toward the front of the vehicle, so that the tip of the lower end of the ladder becomes closer to a rear wheel by the increased length to cause the ladder to be caught by the rear wheel.

In order to prevent the ladder from being caught by the rear wheel, it is necessary to shift the setting position of the ladder backward. However, when the ladder is shifted backward, a projecting amount of the ladder below the departure-angle-defining line is increased, so that the ladder may not be sufficiently apart from the ground even when the ladder is folded backward. Accordingly, the folded ladder is likely to be pushed on rocks or the like on the ground and be damaged.

An object of the invention is to provide a ladder of a working vehicle which is prevented from being caught by a wheel even when a height from the ground to the ladder is decreased.

Means for Solving the Problems

According to an aspect of the invention, a ladder of a working vehicle in a multi-step structure includes: a first front connecting member and a first rear connecting member that are connected to a lateral side of a vehicle body and between a wheel and an end of the vehicle body and that are juxtaposed with a predetermined space in a vehicle front-back direction; a first step board that is connected in a pivotally movable manner between respective lower ends of the first front connecting member and the first rear connecting member; a second front connecting member and a second rear connecting member, respective upper ends of which are connected in a pivotally movable manner to both ends of the first step board in the vehicle front-back direction; and a second step board that is connected in a pivotally movable manner between respective lower ends of the second front connecting member and the second rear connecting member, in which one of the first front connecting member and the first rear connecting member near the wheel is fixed to the vehicle body, and the other one of the first front connecting member and the first rear connecting member near the end of the vehicle body is connected in a pivotally movable manner to the vehicle body and is foldable.

Note that "to be pivotally movable" herein encompasses folding in a predetermined direction by elastic deformation. "Fixing" refers to a connected state in which pivotal movement and folding is impossible.

According to the exemplary embodiment, since the connecting member is connected to the vehicle body in a manner to avoid pivotal movement and folding of the connecting member, even when the length of the suspended part of the ladder is increased to decrease the height from the ground to the ladder, the tip of the ladder does not reach the wheel when the ladder is folded toward the wheel, thereby avoiding the ladder from being caught by the wheel.

The ladder according to the above aspect of the invention preferably further includes a lowermost front connecting member and a lowermost rear connecting member respectively provided under the second front connecting member and the second rear connecting member, the lowermost front connecting member and the lowermost rear connecting member being elastically deformable.

With this arrangement, it is preferable that each of the front connecting member and the rear connecting member that are elastically deformable includes a laminate of a plurality of elastic plates.

With this arrangement, it is preferable that each of upper and lower ends of each of the pivotal front connecting member and the pivotal rear connecting member is connected, in a pivotally movable manner, to a connecting bracket fixed to the vehicle body or a connecting bracket provided at each of ends of all the step boards in the vehicle front-back direction, and the connecting bracket includes a cutout hole that is open upward and/or downward and receives the pivoting front connecting member and the pivoting rear connecting member.

With this arrangement, it is preferable that the ladder is folded between a departure-angle-defining line that connects the wheel and a vehicle rear bottom of the vehicle body and connected positions of the first front connecting member and the first rear connecting member to the vehicle body.

DESCRIPTION OF EMBODIMENT(S)

A first exemplary embodiment of the invention will be described below with reference to the attached drawings.

Figure 1:
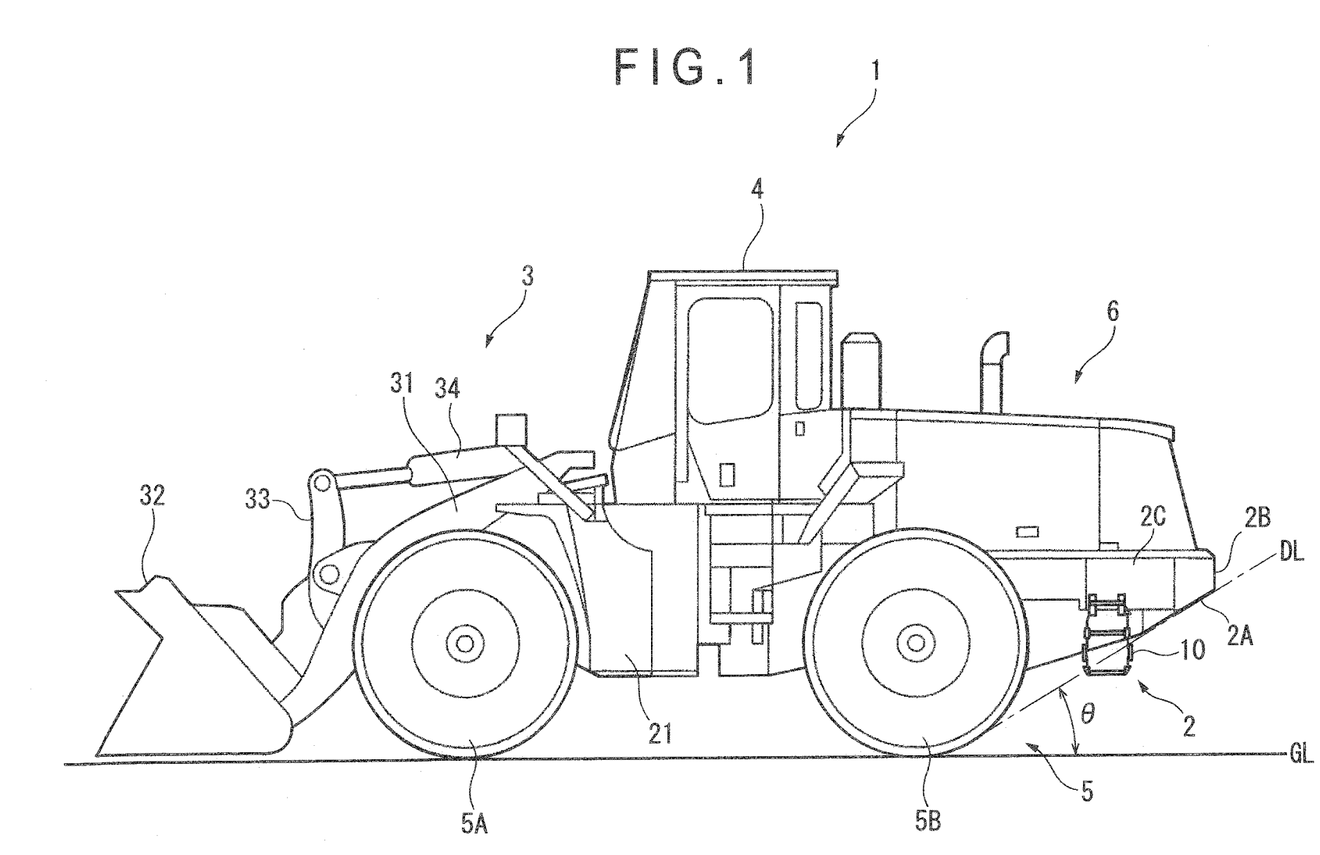
FIG. 1 is a perspective view of a working vehicle using a ladder according to a first exemplary embodiment of the invention.
Figure 2:
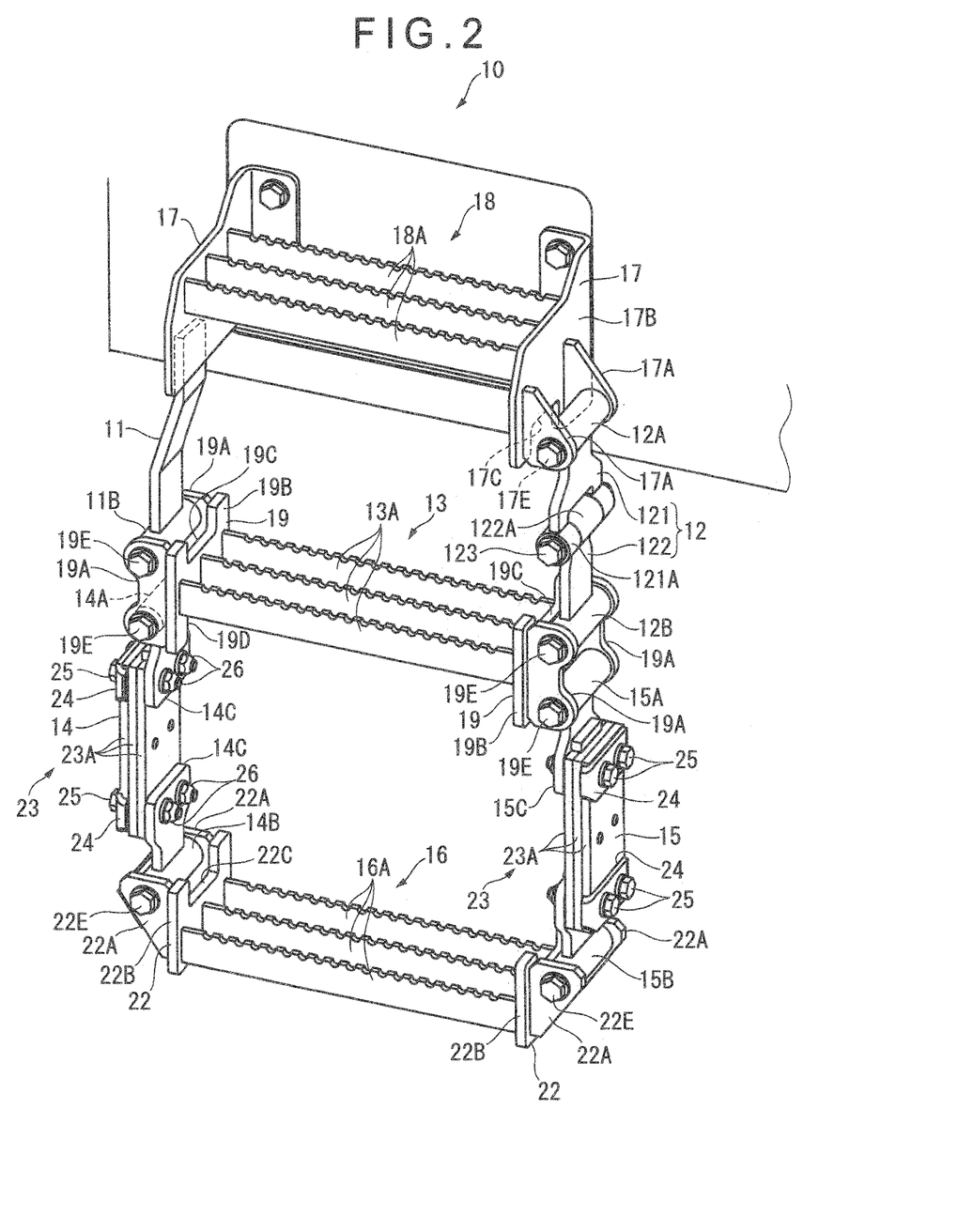
FIG. 2 is a perspective view of the ladder.

FIG. 1 is a perspective view of a wheel loader 1 (working vehicle) using a ladder 10 according to the first exemplary embodiment of the invention. FIG. 2 is a perspective view of the ladder 10.

Description of Overall Wheel Loader

As shown in FIGS. 1 and 2, the wheel loader 1 includes a vehicle body 2, working equipment 3, cab 4, traveling device 5, and power output section 6.

The vehicle body 2 is formed of a steel frame for supporting the working equipment 3, the cab 4, and the power output section 6. A structure body 21 is provided to a front of the vehicle body 2 in a manner to be revolvable in a right-left direction relative to the vehicle body 2. The working equipment 3 is provided to the vehicle body 2 anterior to the structure body 21.

The working equipment 3 includes booms 31 that are pivotally supported by the structure body 21, a bucket 32 that is pivotally supported by the booms 31 to move upward and downward, and a bell crank 33 that is pivotally supported by a middle portion between the booms 31.

The booms 31 are provided in a pair in a vehicle width direction and are pivotally supported by the structure body 21 to move upward and downward. A lift cylinder (not shown) is pivotally supported by a middle portion provided between the booms 31, a base of the lift cylinder being pivotally supported by the structure body 21. The lift cylinder is hydraulically expanded and contracted to move the booms 31 upward and downward.

The bucket 32 is a portion for loading dug soil and the like. The bucket 32 is pivotally supported by a first end of a link (not shown) at a position higher than a position where the bucket 32 is pivotally supported by the booms 31. A second end of the link is pivotally supported by a lower end of the bell crank 33.

The bell crank 33 is pivotally supported by the booms 31. The lower end of the bell crank 33 is connected to a base (second end) of the link. A tilt cylinder 34 is pivotally supported by an upper end of the bell crank 33. A base of the tilt cylinder 34 is pivotally supported by the structure body 21.

The wheel loader moves forward with the bucket 32 positioned near the ground. When the lift cylinder is expanded while the bucket 32 is digging in soil and sand and the like (a digging target), the booms 31 are moved upward with the bucket 32 loaded with the dug soil, so that the digging operation can be performed. Further, when the tilt cylinder 34 is contracted while the bucket 32 is located at a high position, the upper end of the bell crank 33 is moved toward the vehicle body 2, so that the lower end of the bell crank 33 is moved toward a front of the vehicle. Accordingly, the link pushes an upper portion of the bucket 32 toward the front of the vehicle to revolve the bucket 32, so that the dug soil loaded in the bucket 32 can be put down into a bed of a dump truck and the like.

The traveling device 5 includes: front wheels 5A and rear wheels 5B that are respectively provided at four positions of lateral sides of the vehicle body 2; axles (not shown in FIGS. 1 and 2) that rotatably support the front wheels 5A and the rear wheels 5B to the vehicle body 2; and a drive shaft that is connected to each of the axles via a differential gear substantially at a middle in the vehicle width direction of the vehicle body 2. The drive shaft is connected to an engine installed in the power output section 6 via a torque converter. When the engine is rotated, a rotation speed is converted by a transmission via the torque converter to rotate the drive shaft. The rotation of the drive shaft is transmitted to the front wheels 5A and the rear wheels 5B via the differential gear and the axles, so that the wheel loader 1 travels.

The ladder 10 for an operator and a maintenance engineer to climb up and down in order to move between the ground and an engine room is provided on a lateral side of the vehicle body 2 and between one of the rear wheels 5B and a rear end 2A of the vehicle body 2. In recent years, it has been desired to decrease a height from the ground GL to the ladder 10 for easier access to the ladder 10 (assuming that the height is 600 mm in an exemplary embodiment of the invention), so that a length of a suspended part of the ladder 10 below the vehicle body 2 is longer than a typical one. Consequently, a lower end of the ladder 10 is suspended beyond a departure-angle-defining line DL more prominently than a typical ladder. Note that the departure-angle-defining line DL is a line connecting one of the rear wheels 5B and a lower surface of a counter weight 2B (rear bottom) of the vehicle body 2 and defines a departure angle θ.

One of the operations of the wheel loader 1 is a scraping operation. This operation is performed by the wheel loader 1 climbing up a mound while scraping the ground in front of the wheel loader 1. As the wheel loader 1 climbs up the mound, the front of the vehicle body 2 is inclined upward. At this time, the maximum range in which the vehicle body 2 can be inclined is determined by the departure angle θ. During the scraping operation, the vehicle body 2 is occasionally inclined in the maximum range, in which a part of the ladder 10 which is suspended beyond the departure-angle-defining line DL comes into contact with the ground GL. For this reason, the ladder generally has a foldable structure in which the ladder is folded to avoid contact with the ground in the case of contact with the ground GL. Also in the ladder 10 of the exemplary embodiment, the foldable structure is used to solve the problem caused when the length of the suspended part of the ladder 10 is increased. The ladder 10 will be described in detail below.

Description of Overall Steps

Figure 3:
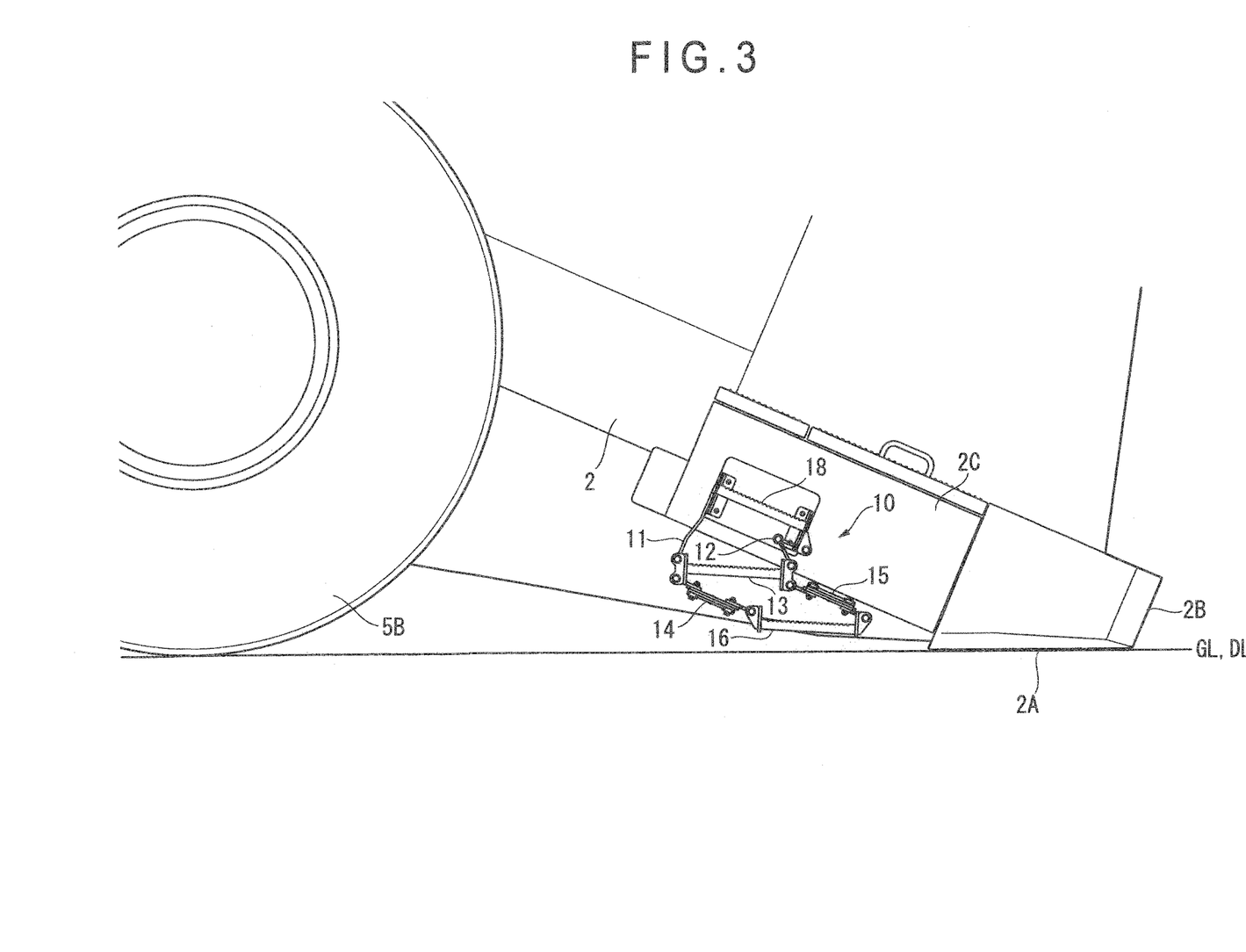
FIG. 3 is a side view showing the ladder when the working vehicle moves forward during a scraping operation.
Figure 4:
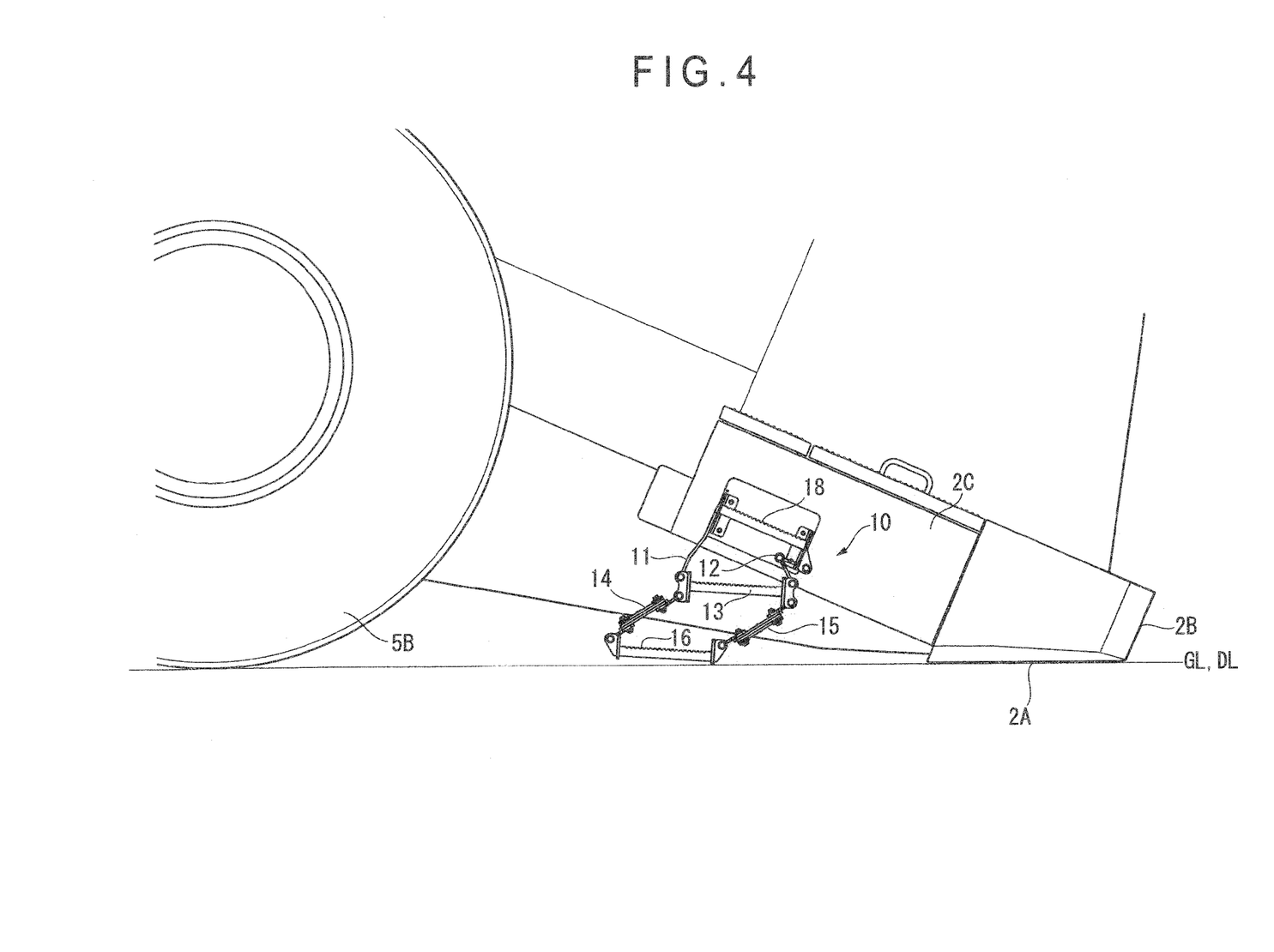
FIG. 4 is a side view showing the ladder when the working vehicle moves backward during the scraping operation.

FIG. 2 is a perspective view of the ladder 10. FIG. 3 is a side view showing the ladder 10 when the wheel loader 1 moves forward during the scraping operation. FIG. 4 is a side view showing the ladder 10 when the wheel loader 1 moves backward during the scraping operation.

As shown in FIGS. 2 to 4, an upper end of the ladder 10 is connected to a lateral side of the vehicle body 2 and between one of the rear wheels 5A and the rear end 2A of the vehicle body 2. The ladder 10 in a two-step structure includes: a first front connecting member 11 and a first rear connecting member 12 which are juxtaposed with a predetermined space in a vehicle front-back direction; a first step board 13 that is connected in a pivotally movable manner between respective lower ends of the first front connecting member 11 and the first rear connecting member 12; a second front connecting member 14 and a second rear connecting member 15, respective upper ends of which are connected in a pivotally movable manner to both ends of the first step board 13 in the vehicle front-back direction; and a second step board 16 that is connected in a pivotally movable manner between respective lower ends of the second front connecting member 14 and the second rear connecting member 15. The two-step structure is defined by two U-shaped sections, each of which is formed by the step board and the connecting members connected to both ends of the step board.

Among the first front connecting member 11 and the first rear connecting member 12, the first front connecting member 11 near the rear wheel 5A is fixed to the vehicle body 2, in other words, the first front connecting member 11 is connected to the vehicle body 2 in a manner to avoid pivotal movement and folding. The first rear connecting member 12 near the rear end 2A of the vehicle body 2 is connected in a pivotally movable manner to the vehicle body 2 and is foldable substantially from the middle thereof in a vertical direction. The first front connecting member 11 and the first rear connecting member 12 are formed of a metal material and the like. The second front connecting member 14 and the second rear connecting member 15 are formed including an elastic material.

Description of Folding Structure of Steps

More specifically, a box 2C such as a battery box and a tool box is provided to the lateral side of the vehicle body 2. A pair of metallic connecting brackets 17 are fixed to a lateral side of the box 2C with bolts in a manner to be spaced from each other in the vehicle front-back direction. The first front connecting member 11 is fixed to the connecting brackets 17 by welding and the like in non-pivotal manner while an upper end of the first rear connecting member 12 is pivotally attached to the connecting brackets 17. The upper end of the first rear connecting member 12 is defined as a cylindrical portion 12A. The cylindrical portion 12A is interposed between a pair of attachment pieces 17A provided to the connecting brackets 17 in the back of the vehicle body 2. The cylindrical portion 12A pivots on a horizontal bolt 17E (a pivot) that penetrates the cylindrical portion 12A and the attachment pieces 17A in the vehicle width direction. In the exemplary embodiment, the front and rear connecting brackets 17 are mutually jointed by three steel plates 18A. The three steel plates 18A provide a top step board 18.

Lower ends of the first front connecting member 11 and the first rear connecting member 12 and upper ends of the second front connecting member 14 and the second rear connecting member 15 are respectively defined as cylindrical portions 11B, 12B, 14A and 15A. Connecting brackets 19 are provided to both ends of the first step board 13 in the vehicle front-back direction. Each of the connecting brackets 19 includes a pair of attachment pieces 19A. The cylindrical portions 11B, 12B, 14A and 15A each are pivotally attached between the pair of attachment pieces 19A with a bolt 19E (a pivot).

The first step board 13 is provided by three steel plates 13A jointed between the front and rear connecting brackets 19.

Similarly, lower ends of the second front connecting member 14 and the second rear connecting member 15 are respectively defined as cylindrical portions 14B and 15B. Connecting brackets 22 are provided to both ends of the second step board 16 in the vehicle front-back direction. Each of the connecting brackets 22 includes a pair of attachment pieces 22A. The cylindrical portions 14B and 15B each are attached between the pair of attachment pieces 22A with a bolt 22E (a pivot).

The second step board 16 is also provided by three steel plates 16A jointed between the front and rear connecting brackets 22.

The connecting brackets 19 and 22 are made of metal.

Thus, the folding structure of the ladder 10 is achieved by the mutual pivotal movement of the connecting members 12, 14 and 15 and the step boards 13 and 16.

As described above, a folding amount of the ladder 10 is restricted since only the upper end of the first front connecting member 11 is non-pivotal. In other words, although the length of the suspended part of the ladder 10 is longer than a typical one, the folding amount of the ladder 10 is not so large as to be substantially flat when the ladder 10 are folded backward or forward as shown in FIGS. 3 and 4. Accordingly, particularly when the wheel loader 1 moves backward, a tip of the lower end of the ladder 10 does not reach one of the rear wheels 5B as shown in FIG. 4. Even when the ladder 10 are folded either forward or backward, the ladder 10 are folded and received between the departure-angle-defining line DL and the position at which the first front connecting member 11 and the first rear connecting member 12 are connected to the vehicle body 2. Accordingly, even when the ladder 10 comes into contact with a rock on the ground GL, the ladder 10 are folded by the impact of the contact, so that the ladder 10 can be restrained from being damaged.

Folding Structure of Connecting Member

The first rear connecting member 12 includes: an upper connecting piece 121 that has the cylindrical portion 12A at an upper end thereof; and a lower connecting piece 122 that has the cylindrical portion 12B at a lower end thereof. The upper connecting piece 121 includes a hinge 121A at a lower end. The lower connecting piece 122 includes a hinge 122A at an upper end. The connecting pieces 121 and 122 are mutually connected to a bolt 123 (a pivot) that penetrates the hinges 121A and 122A in a manner to be pivotally movable on the bolt 123.

Description of Elastic Structure of Connecting Member

The second front connecting member 14 and the second rear connecting member 15 each include a block laminate 23 in which a plurality of elastic plates 23A formed of an elastic material (e.g., synthetic rubber and natural rubber) are integrally riveted. Metallic hinge members 14C and 15C respectively formed with the cylindrical portions 14A and 14B and the cylindrical portions 15A and 15B are fixed to upper and lower ends of the laminate 23 with a seat 24, a bolt 25 and a nut 26. With the elastically deformable laminate 23, the second front connecting member 14 and the second rear connecting member 15 are less likely to be damaged even in contact with rocks and the like on the ground.

Description of Interference Prevention Structure of Connecting Bracket

Further, the rear connecting bracket 17 has the attachment pieces 17A and a bonding piece 17B bonded with the top step board 18. In the rear connecting brackets 17, the bonding piece 17B has a cutout hole 17C that is open downward in a U-shape and positioned between the attachment pieces 17A. When the first rear connecting member 12 pivots, the upper end of the first rear connecting member 12 is to be received in the cutout hole 17C, thereby preventing mutual interference between the first rear connecting member 12 and the connecting bracket 17 when the ladder 10 are folded.

Similarly, the bonding piece 19B of each of the front and rear connecting brackets 19 has a cutout hole 19C that is open upward in a U-shape and a cutout hole 19D that is open downward in a U-shape, the cutout holes 19C and 19D being positioned between the attachment pieces 19A. When the first step board 13 pivots, since the lower end of the first front connecting member 11 may interfere with the front connecting bracket 19, the lower end of the first front connecting member 11 is to be received in the cutout hole 19C in order to avoid such interference. On the other hand, the lower end of the pivoting first rear connecting member 12 is to be received in the rear connecting bracket 19. The upper end of each of the second front connecting member 14 and the second rear connecting member 15 is to be received in the cutout hole 19D. Accordingly, not only the interference between the first front connecting member 11/the first rear connecting member 12 and the connecting brackets 19 but also the interference between the second front connecting member 14/the second rear connecting member 15 and the connecting brackets 19 can be prevented.

A bonding piece 22B of each of the connecting brackets 22 also has a cutout hole 22C that is open upward in a U-shape and positioned between the attachment pieces 22A. The lower end of each of the pivoting second front connecting member 14 and second rear connecting member 15 is to be received in the cutout hole 22C, thereby preventing the interference between the second front connecting member 14/the second rear connecting member 15 and the connecting brackets 22.

Description of Scraping Operation

When the wheel loader 1 with the aforementioned ladder 10 performs the scraping operation, as shown in FIG. 3, the forwarding wheel loader 1 can be inclined with the front of the vehicle body 2 facing upward to a maximum limit where the departure-angle-defining line DL is in alignment with the ground GL. During such inclination, the lower end of the ladder 10 gradually becomes closer to the ground GL. At a predetermined inclination or more, the second front connecting member 14, the second rear connecting member 15, and the second step board, which define the lower end of the ladder 10, begin to pivot. Subsequently, the first rear connecting member 12 and the first step board 13 pivot. Thus, the entire ladder 10 pivot toward the rear of the vehicle and is folded between the departure-angle-defining line DL and the connecting position of the ladder 10 to the vehicle body 2.

On the other hand, when the wheel loader 1 moves backward after finishing the scraping of the mound, the departure-angle-defining line DL (i.e., the lower surface of counter weight 2B) is gradually apart from the ground GL, where the folded ladder 10 is gradually returned to an original state. Depending on the circumstances, as shown in FIG. 4, the entire ladder 10 pivot toward the front of the vehicle, whereby the ladder 10 are folded between the departure-angle-defining line DL and the connecting position of the ladder 10 to the vehicle body 2.

Advantage(s) of Embodiment(s)

According to the exemplary embodiment, in the ladder 10, since the first front connecting member 11 near the rear wheel 5B is connected in a manner to avoid pivotal movement and folding, even when the length of the suspended part of the ladder 10 is increased to decrease the height from the ground, the tip of the ladder 10 does not reach the rear wheel 5B to avoid the ladder 10 from being caught by the rear wheel 5B.

The invention is not limited to the above-described embodiment, but includes modifications and improvements as long as an object of the invention can be achieved.

For instance, although the exemplary embodiment of the invention provided with the top step board 18 is described, the top step board 18 is not a requisite of the invention but may be omitted as needed in consideration of a distance between the first step board 13 and the engine room, or the like.

Although the bonding piece 17B of the rear connecting bracket 17, the bonding pieces 19B of the front and rear connecting brackets 19, and the bonding pieces 22B of the front and rear connecting bracket 22 have the respective cutout holes 17C, 19C and 19D, and 22C, the interference between the connecting members and the connecting brackets may be avoided by changing shapes of the attachment pieces and the bonding pieces without providing such cutout holes. However, since a strength of the entire connecting brackets is possibly affected by a significant change in a size of the attachment pieces and a shape of the bonding pieces and the like, the structure provided with the cutout holes is suitable for avoiding the interference.

The first rear connecting member may be folded by elastic deformation of an elastic material. However, in terms of rigidity balance, the first rear connecting member is preferably formed of the same material (e.g., metal material) as that for the first front connecting member, thereby securing the stability when stepping on the first step board.

The invention encompasses the arrangement in which both of the second front connecting member and the second rear connecting member are formed of a metal material.

Depending on the type of the working vehicle (i.e., other than the wheel loader), the ladder of the invention may be provided between the front wheel and a front end of the vehicle body.

The elastically deformable connecting member may be provided by a piece of rubber plate to be elastically deformable, or alternatively, may be provided by a composite member of a rubber plate and a flexible metal plate (e.g., lead) to be elastically deformable.

The ladder of the invention may be provided not only in a two-step structure but also in a multi-step structure having three or more steps. Among the first front connecting member and the first rear connecting member, the connecting member near the wheel may be fixed to the vehicle body in non-pivotal manner while the connecting member near the end of the vehicle body may be connected in a pivotally movable manner to the vehicle body and be foldable substantially in the middle thereof in a vertical direction.

The invention is applicable to a working vehicle including an off-road dump truck and the like in addition to a wheel loader.

The invention claimed is:

1. A ladder of a working vehicle in a multi-step structure, comprising:
   a first front connecting member and a first rear connecting member that are connected to a lateral side of a vehicle body and between a wheel and an end of the vehicle body and that are juxtaposed with a predetermined space in a vehicle front-back direction;
   a first step board that is connected in a pivotally movable manner between respective lower ends of the first front connecting member and the first rear connecting member;
   a second front connecting member and a second rear connecting member, wherein an upper end of one of the second front connecting member and the second rear connecting member is connected in a pivotally movable manner to a first end of the first step board in the vehicle front-back direction, and an upper end of the other of the second front connecting member and the second rear connecting member is connected in a pivotally movable manner to a second end of the first step board in the vehicle front-back direction; and
   a second step board that is connected in a pivotally movable manner between respective lower ends of the second front connecting member and the second rear connecting member, wherein:
   an upper end of one of the first front connecting member and the first rear connecting member near the wheel is fixed to the vehicle body, so as to be incapable of any pivotal movement with respect to the vehicle body,
   an upper end of the other of the first front connecting member and the first rear connecting member near the end of the vehicle body is connected in a pivotally movable manner to the vehicle body and is foldable;
   the upper end of the other of the first front connecting member and the first rear connecting member near the end of the vehicle body is connected in a pivotally movable manner to a first connecting bracket that is fixed to the vehicle body, and the first connecting bracket comprises a cutout hole that is open downward and that is adapted to receive the other of the first front connecting member and the first rear connecting member.

2. The ladder of the working vehicle according to claim 1, wherein the second front connecting member and the second rear connecting member are elastically deformable.

3. The ladder of the working vehicle according to claim 2, wherein each of the second front connecting member and the second rear connecting member comprises a laminate of a plurality of elastic plates.

4. The ladder of the working vehicle according to claim 1, wherein the ladder is folded between a departure-angle-defining line that connects the wheel and a vehicle rear bottom of the vehicle body and connected positions of the first front connecting member and the first rear connecting member to the vehicle body.

5. The ladder of the working vehicle according to claim 1, wherein:
   a lower end of the one of the first front connecting member and the first rear connecting member is connected in the pivotally movable manner to a second connecting bracket provided on the first end of the first step board in the vehicle front-back direction, and a lower end of the other of the first front connecting member and the first rear connecting member is connected in the pivotally movable manner to a third connecting bracket provided on the second end of the first step board in the vehicle front-back direction, and
   each of the second and third connecting brackets provided on the ends of the first step board comprises an upward cutout hole that is open upward, wherein the upward cutout hole of the second connecting bracket is adapted to receive the one of the first front connecting member and the first rear connecting member.

6. The ladder of the working vehicle according to claim 5, wherein:
   the upper end of the one of the second front connecting member and the second rear connecting member is connected in the pivotally movable manner to the second connecting bracket provided on the first end of the first step board in the vehicle front-back direction, and the upper end of the other of the second front connecting member and the second rear connecting member is connected in the pivotally movable manner to the third connecting bracket provided on the second end of the first step board in the vehicle front-back direction, and
   each of the second and third connecting brackets provided on the ends of the first step board further comprises a downward cutout hole that is open downward, wherein the downward cutout hole of the second connecting bracket is adapted to receive the one of the second front connecting member and the second rear connecting member and the downward cutout hole of the third connecting bracket is adapted to receive the other of the second front connecting member and the second rear connecting member.

7. The ladder of the working vehicle according to claim 6, wherein:
   the lower end of the one of the second front connecting member and the second rear connecting member is connected in the pivotally movable manner to a fourth connecting bracket provided on a first end of the second step board in the vehicle front-back direction, and the lower end of the other of the second front connecting member and the second rear connecting member is connected in the pivotally movable manner to a fifth connecting bracket provided on a second end of the second step board in the vehicle front-back direction, and each of the fourth and fifth connecting brackets provided on the ends of the second step board comprises an upward cutout hole that is open upward, wherein the upward cutout hole of the fourth connecting bracket is adapted to receive the one of the second front connecting member and the second rear connecting member and the upward cutout hole of the fifth connecting bracket is adapted to receive the other of the second front connecting member and the second rear connecting member.

* * * * *